(12) United States Patent
Hilgers

(10) Patent No.: US 7,537,384 B2
(45) Date of Patent: May 26, 2009

(54) RECORDING AND STORING A TEMPERATURE

(75) Inventor: Achim Hilgers, Alsdorf (DE)

(73) Assignee: NXP B.V., Eindhoven (NL)

( * ) Notice: Subject to any disclaimer, the term of this patent is extended or adjusted under 35 U.S.C. 154(b) by 229 days.

(21) Appl. No.: 11/597,882

(22) PCT Filed: May 17, 2005

(86) PCT No.: PCT/IB2005/051591

§ 371 (c)(1),
(2), (4) Date: Nov. 27, 2006

(87) PCT Pub. No.: WO2005/116599

PCT Pub. Date: Dec. 8, 2005

(65) Prior Publication Data

US 2007/0242727 A1   Oct. 18, 2007

(30) Foreign Application Priority Data

May 27, 2004   (EP)   .................................. 04102365

(51) Int. Cl.
*G01K 5/70*   (2006.01)
*G01K 1/00*   (2006.01)
*G01K 7/00*   (2006.01)

(52) U.S. Cl. ........................ 374/186; 374/176; 374/177

(58) Field of Classification Search ................. 374/186, 374/177, 176

See application file for complete search history.

(56) References Cited

U.S. PATENT DOCUMENTS 6,617,963 B1   9/2003   Watters et al.

*Primary Examiner*—Lisa M Caputo
*Assistant Examiner*—Mirellys Jagan

(57) ABSTRACT

In a temperature-recording method for recording a temperature by means of an electrical circuit of a data storage medium, which electrical circuit is suppliable with energy by means of a signal feedable to the data storage medium, provision is made for a physical variable dependent on the temperature to be recorded by means of the circuit supplied with energy, the physical variable being influenced by a temperature-recording material (1, 7), preferably a piezoelectric or ferroelectric material, co-operating with the circuit, which material comprises alignable electric or magnetic elementary dipoles (3), and for which temperature-recording material (1, 7) a Curie temperature is known, exceeding of which causes the alignment of the elementary dipoles to be lost, and the temperature-recording material (1, 7) being selected in such a way that its known Curie temperature corresponds to a predetermined limit temperature.

12 Claims, 3 Drawing Sheets

RECORDING AND STORING A TEMPERATURE

FIELD OF THE INVENTION

The invention relates to a temperature-recording method for recording and storing a temperature.

The invention relates furthermore to a temperature-recording arrangement for recording and storing a temperature.

The invention relates furthermore to a use of a data storage medium for recording and storing a temperature.

BACKGROUND OF THE INVENTION

Such a temperature-recording method, such a temperature-recording arrangement and such a use are known from the document U.S. Pat. No. 6,617,963 B1. This document discloses a recording device, which permits a wireless (contactless) interrogation in order to determine its identity and its state. The state indicates whether one or more physical or chemical events have taken place. For example, a temperature can be measured and the result of the measurement can be stored. For that purpose, the recording device comprises a circuit that includes several parallel-connected individual capacitors, the overall capacitance being varied by specific disconnection or addition of individual capacitors. On measuring a temperature, individual capacitors are irreversibly disconnected from the parallel connection by meltable fuses responsive to specific temperatures, similar to temperature-sensitive switches. The temperature is measured through recording the resulting overall capacitance.

In the case of the known recording device, it has proved a disadvantage that its manufacture is complicated because of the different components needed, and is therefore expensive. In addition, the temperature-sensitive fuses may require trimming during the manufacturing process, which results in further increased costs and work time.

OBJECT AND SUMMARY OF THE INVENTION

It is an object of the invention to produce a temperature-recording method of the kind specified in the first paragraph, a temperature-recording arrangement of the kind specified in the second paragraph and a use of the kind specified in the third paragraph, in which the above-mentioned disadvantages are avoided.

To achieve the above-mentioned object, a temperature-recording method according to the invention is provided with features according to the invention so that a method according to the invention is characterizable in the manner specified below, namely:

Temperature-recording method for recording a temperature by means of an electrical circuit of a data storage medium, which electrical circuit is suppliable with energy by means of a signal feedable to the data storage medium, the method comprising the recording of a physical variable dependent on the temperature by means of the circuit supplied with energy, the physical variable being influenced by a temperature-recording material, preferably a piezoelectric or ferroelectric material, co-operating with the circuit, which material comprises alignable electric or magnetic elementary dipoles, and for which temperature-recording material a Curie temperature is known, the alignment of the elementary dipoles being lost when this temperature is exceeded, and the temperature-recording material being selected in such a way that its known Curie temperature corresponds to a pre-determined limit temperature.

The expression "electric or magnetic elementary dipoles" shall be understood to include both dipoles of electrical charge carriers and molecular magnets. In this connection, the alignment of the elementary dipoles comprises the polarization or magnetization of the temperature-recording material. Furthermore, in this connection, the loss of alignment of the elementary dipoles comprises the depolarization or demagnetization of the temperature-recording material.

To achieve the above-mentioned object, a temperature-recording arrangement according to the invention is provided with features according to the invention so that an arrangement according to the invention is characterizable in the manner specified below, namely:

Temperature-recording arrangement for recording a temperature, comprising a temperature-recording material with alignable electric or magnetic elementary dipoles, preferably a piezoelectric or ferroelectric material, wherein the temperature-recording material has a Curie temperature, exceeding of which causes the alignment of the elementary dipoles to be lost, and the temperature-recording material is selected in such a way that its Curie temperature corresponds to a predetermined limit temperature, and means for recording a physical variable dependent on the alignment of the elementary dipoles in the temperature-recording material, wherein the temperature-recording arrangement is realized by a data storage medium and wherein the means are realized by means of a circuit of the data storage medium, which electrical circuit co-operates with the temperature-recording material and which circuit is suppliable with energy by means of a signal feedable to the data storage medium, so that the physical variable is recordable by means of the circuit.

To achieve the above-mentioned object, a use according to the invention is provided with features according to the invention, so that a use according to the invention is characterizable in the manner specified below, namely:

Use of a data storage medium for recording a temperature, which data storage medium comprises an electrical circuit, which is suppliable with energy by means of a signal feedable to the data storage medium, so that a physical variable dependent on the temperature is recordable by means of the circuit supplied with energy, wherein a temperature-recording material, preferably a piezoelectric or ferroelectric material, is used to record the temperature, which material co-operates with the circuit and which influences the physical variable recordable by means of the circuit and which comprises alignable electric or magnetic elementary dipoles and for which temperature-recording material a Curie temperature is known, exceeding of which causes the alignment of the elementary dipoles to be lost, and the temperature-recording material is selected in such a way that its known Curie temperature corresponds to a predetermined limit temperature.

By means of the features according to the invention, a reliably operating temperature-recording method and a reliably operating temperature-recording arrangement are provided and an inventive use of a data storage medium according to the invention is provided, wherein no waiting and no external energy supply is required reliably to store a temperature that has occurred or the exceeding of a temperature limit value. In particular, it has proved advantageous that the temperature-recording arrangement according to the invention can be manufactured relatively inexpensively and can be used for a virtually unlimited time period, which means that there is no obstacle to a re-use even after the occurrence of a temperature limit value. The method according to the invention and the arrangement according to the invention are admirably suited to the monitoring of products in a cold chain. Incorporated in a data storage medium, which can be preferably contactlessly read out, in combination with a reading device it is possible to check easily and quickly whether or not the temperature to which the data storage medium was exposed has exceeded a pre-determined temperature limit value. The combination of the data storage medium according to the invention and reading device can advantageously be in the form of a wireless (contactless) transponder system (e.g. an RFID system), with which, for example, the maintenance of the cold chain of perishable foodstuffs etc. can be simply and quickly contactlessly monitored.

The advantage obtained in accordance with the measures of claims 2 and 9 is that the temperature can be recorded indirectly by measuring physical variables, which can be recorded simply and for which proven evaluating circuits are available.

The advantage obtained in accordance with the measures of claims 3 and 10 is that an exact monitoring of a pre-determined limit temperature can be carried out, the result of monitoring being a yes/no result which can be easily and quickly evaluated. For example, for perishable foodstuffs there are regulations relating to the maximum temperature to which they may be exposed over the entire cold chain from production to the chill cabinet at the grocery. If this prescribed maximum temperature is exceeded at just one point of the cold chain, then the affected foodstuff must be rejected.

The advantage obtained in accordance with the measures of claims 4 and 11 is that the absolute temperature is recordable and storable so that it is possible to establish the temperature to which a product was exposed and on the basis of this temperature to make a decision about the further treatment of the product.

The advantage obtained in accordance with the measures of claims 5 and 12 is that a relative measurement of the change in the initial state of the physical variable to be measured is carried out, so that in general no calibration of the temperature-recording material is necessary. In addition, relative measurements can often be carried out more simply and more accurately than absolute measurements.

The advantage obtained in accordance with the measures of claims 6 and 13 is an especially simple and versatile evaluation of the degree of alignment of the elementary dipoles in the temperature-recording material.

The advantage obtained in accordance with the measures of claims 7 and 14 is that the temperature-recording method according to the invention and the temperature-recording arrangement according to the invention are repeatedly usable, the additional advantage being, in the case of a magnetizable temperature-recording material, that its re-activation can be effected by contactless application of a magnetic field.

These and other aspects of the invention are apparent from and will be elucidated, by way of non-limitative example, with reference to the embodiments described hereinafter.

DESCRIPTION OF EMBODIMENTS

Figure 1:
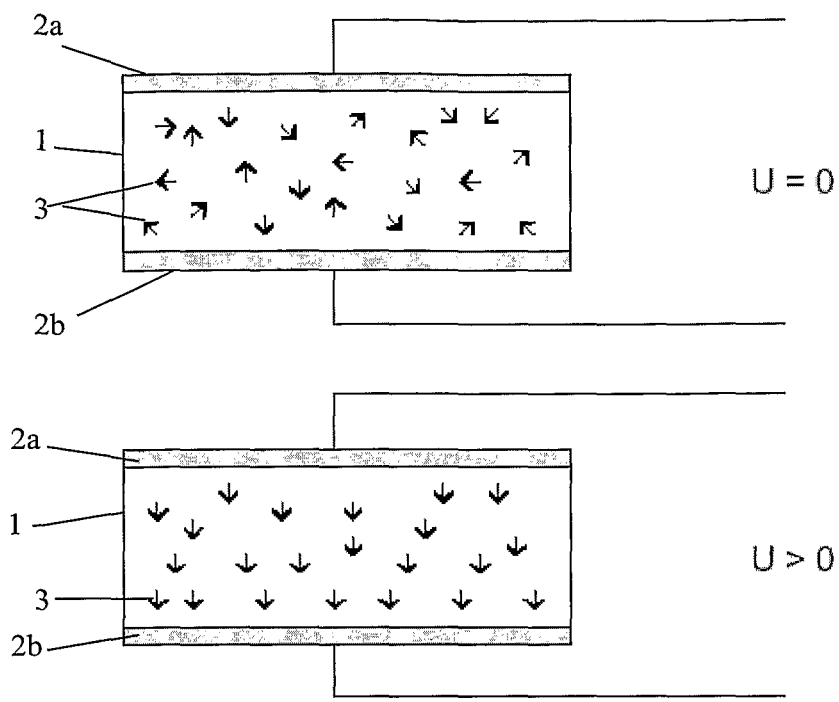
FIG. 1 shows schematically a temperature-recording material according to the invention in the untreated state (unpolarized) and in the activated state (polarized).

FIG. 1 shows a temperature-recording material 1, which is used for carrying out the temperature-recording method according to the invention. The temperature-recording method according to the invention enables an ambient temperature to be recorded or registered and the exceeding of a pre-determined maximum temperature to be detected and signaled, without at the same requiring energy (that is, a supply voltage, provided by a battery for example). A primary area of application can be the preservation/monitoring of the cold chain of foodstuffs. Other areas of application, such as, for example, monitoring of the temperature of specific temperature-critical processes and/or apparatuses, are likewise intended however.

The temperature-recording material illustrated in FIG. 1 is a piezoelectric material having a plurality of electrical elementary dipoles, which for the purpose of illustration are drawn in schematically in a cross-sectional area of the material. Its mode of operation is based on the piezoelectric effect. In the "raw state" of the piezoelectric temperature-recording material 1, the elementary dipoles 3 have a static distribution, the effect of which, on average, is that the value of an electric voltage U, tapped off at the electrodes 2a, 2b arranged on opposite sides of the temperature-recording material 1, is approximately zero. In this "raw state", the temperature-recording material 1 is consequently an unpolarized material, since it has no predominant alignment of its elementary dipoles 3.

If the piezoelectric temperature-recording material 1 is polarized (for example, by applying an electric voltage at a defined temperature), the elementary dipoles 3 become aligned. After the cooling process (freezing), this alignment is retained, and an electric voltage U>0 can be tapped off. In the normal case, this voltage U>0 does not reduce again until the ambient temperature rises to a value above the Curie temperature of the temperature-recording material 1. At the same time, the polarization of the elementary dipoles is modified to the effect that it corresponds to the original state, in which it is arbitrarily statistically distributed.

In order now to detect that a specific ambient temperature has been exceeded, the material compositions of the temperature-recording material 1 are selected such that the Curie temperature of the temperature-recording material 1 is identical with a pre-defined limit temperature, for example, the maximum temperature to which a product to be monitored may be exposed. If the temperature-recording material 1 is used only for monitoring whether the limit temperature was exceeded or not, a sudden depolarization property of the temperature-recording material used on reaching the Curie temperature is advantageous.

Before the temperature-recording material 1 can be used, it must be "primed", that is, it must first be polarized, for which purpose there are sufficiently well known methods in the art. To test whether the temperature-recording material 1, after it has been "primed", has been exposed to a temperature above the predefined limit temperature, that is, to a temperature above its Curie temperature, the electric voltage U of the temperature-recording material 1 is measured.

Figure 2:
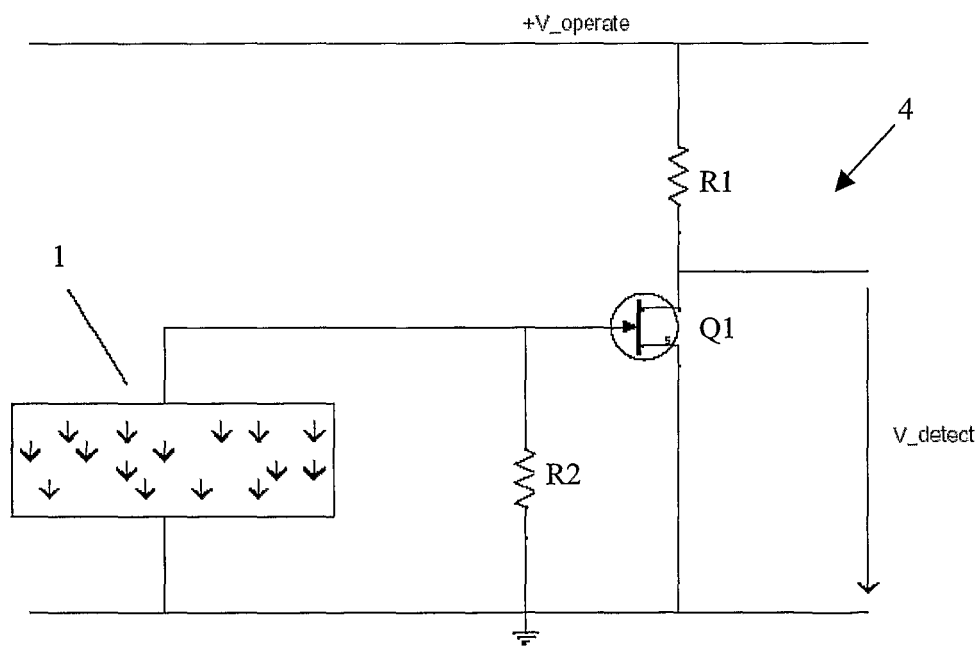
FIG. 2 shows a schematic circuit diagram of an evaluating circuit for the temperature-recording material as shown in FIG. 1.

In the simplest case, in which it is to be determined whether the limit temperature has been exceeded, it is sufficient to check whether an electric voltage is present or not. This can be effected, for example, with the simplified electronic evaluating circuit 4 illustrated in FIG. 2. If the temperature-recording material 1 is still polarized, that is, if its Curie temperature has not been exceeded, then a piezoelectric voltage is present and the transistor Q1 therefore turns on, with the result that at the output of the circuit 4 a voltage V_detect of virtually zero volts is measured. If, on the other hand, the temperature-recording material 1 is depolarized (as a result of the Curie temperature being exceeded), that is, no piezoelectric voltage is present, the transistor Q1 blocks, and a voltage V_detect that is equal to the applied operating voltage +V_operate is measured at the output. The resistors R1 and R2 are used for current limitation and as series-resistance respectively. The exemplary electronic evaluating circuit 4 can be extended in a variety of ways. Thus, for example, discrete differential voltage amplifiers or operational amplifiers can be used when the anticipated piezoelectric voltage is very small. This latter version of the evaluating circuit 4 can also be used, for example, to record an absolute temperature.

Figure 3:
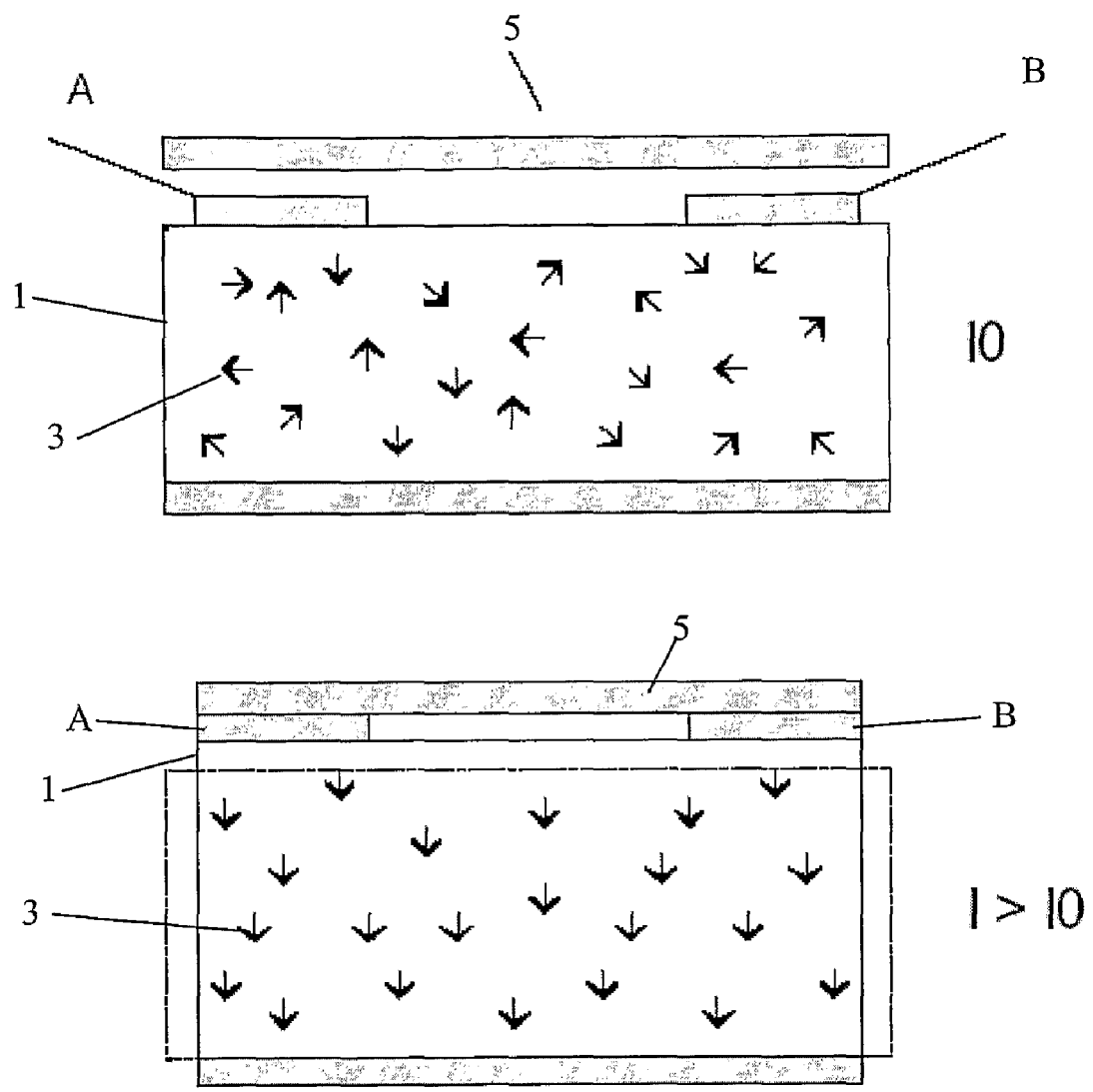
FIG. 3 shows an evaluating switch structure based on the temperature-recording material as shown in FIG. 1.

The use of piezoelectric materials as temperature-recording material 1 provides a simple opportunity of detecting whether or not a limit temperature has been exceeded: the elementary dipoles are aligned by the polarization process. The effect of this in turn is that the piezoelectric material is mechanically deformed. FIG. 3 shows schematically the mechanical deformation of a piezoelectric temperature-recording material 1. In the upper illustration of FIG. 3, the temperature-recording material 1 is in the "raw state", that is, its elementary dipoles are randomly distributed. Two spaced electrical contacts A, B are arranged on the upper side of the temperature-recording material 1. Above and spaced from these contacts there is an electric conductor 5. The lower illustration in FIG. 3 shows the temperature-recording material 1 after it has been "primed", that is, after it has been polarized. The mechanical expansion of the temperature-recording material 1, caused by the polarization, that is, the alignment of the elementary dipoles 3, short-circuits the two contacts A and B by way of the electric conductor 5. On reaching the limit temperature, the expansion of the temperature-recording material 1 reduces, illustrated by the broken lines, and the conductive contact between A and B is interrupted. This creates an easy to detect switching option, which can likewise indicate that a predetermined limit temperature has been exceeded. The use of just two electrical contacts should be mentioned as a modification of this construction of the invention. To be exact, a switching structure can also be created if just one contact A or B and the electric conductor 5 are used.

In addition, it should be mentioned that the switching principle can also be realized by means of micro-electro-mechanical switches (MEMs) or by piezoelectric micro-electro-mechanical switches (PMEMs). It should furthermore be mentioned that to realize a switching structure the temperature-recording material 1 can also be specifically structured (for example, can be in the form of a "bender").

In combination with more complex evaluating electronics, the described temperature-monitoring module moreover enables an absolute temperature to be detected. The requirement for this, in contrast to the yes/no analysis, is, a temperature-recording material 1 that has a "broad" depolarization property. That is, the depolarization when the Curie temperature is exceeded does not occur suddenly, on the contrary, the degree of depolarization is a function of a restricted temperature range: this means that as the temperature increases, the depolarization progresses. The degree of depolarization therefore defines the amplitude of the piezo voltage and ultimately the absolute temperature.

By re-polarization of the temperature-recording material 1 in a manner known per se, the temperature-recording material 1 can be activated again to allow repeated use thereof.

Instead of exploiting the change in a piezo voltage, it is likewise possible to determine the change in impedance of a previously polarized piezoelectric temperature-recording material 1. Through polarization of appropriate materials, the electrical impedance changes, that is, as a rule the reactance is reduced because the capacitance of a polarized structure increases slightly. The difference in capacitance between polarized and unpolarized material can in turn be detected. Simple electrical circuits, which measure, for example, the capacitance or the reactance directly or determine the discharge duration of a capacitor (Tau=R·C) or detect the shift of a resonant frequency ($f=1/(2\pi \cdot \sqrt{(L \cdot C)})$) or the like can again be used for that purpose.

Figure 4:
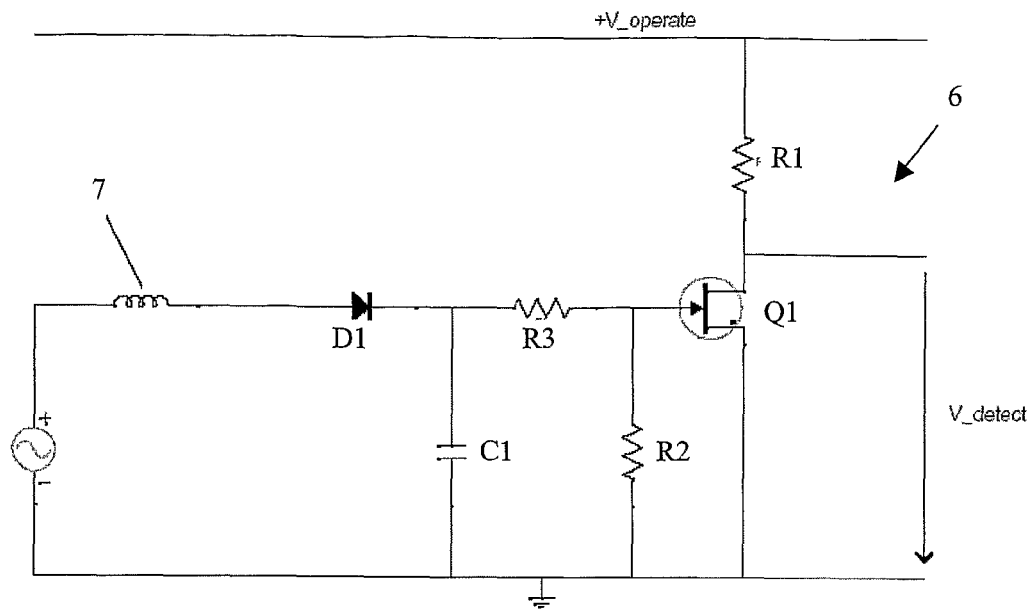
FIG. 4 shows a schematic circuit diagram of an evaluating circuit for a ferroelectric temperature-recording material as shown in FIG. 1.

The temperature-recording material according to the invention is not limited to piezoelectric material, however, but includes polarizable materials and magnetizable materials generally, such as ferrites for example. In the following, a further exemplary embodiment of the invention is described, which makes use of a temperature-recording material 1 whose function is based on a ferroelectric effect. Ferroelectric materials are characterized by a dielectric hysteresis loop, that is, they possess a spontaneous electric polarization that can be folded-over by an external field into another stable position. On being heated above a Curie temperature, the spontaneous polarization is lost, in that a phase transition of the crystalline structure to a lower symmetry takes place. FIG. 4 shows by way of example the principle according to the invention with reference to a simple electronic evaluating circuit. Starting from the temperature-recording material 7, which is used to form a coil whose inductance changes with the ambient temperature, or more accurately, whose inductance declines with increasing temperature, the mode of operation of the circuit 6 is as follows:

The components 7 and C1 form an alternating voltage divider. The partial voltage is rectified by the diode D1 and smoothed by the capacitor C1. The resistors R2 and R3 again from a voltage divider, which limits the drive voltage of the transistor Q1. Depending on the level of the control voltage applied, the transistor Q1 turns on more or less, which in turn leads to a change in the output voltage (V_detect). If the temperature now rises, then the inductance (and hence the reactance) of the coil 7 diminishes. This reduction ultimately results in a rise in the direct voltage at the control input of the transistor Q1, which in turn reduces the output voltage (V_detect) since it turns on further. An absolute temperature can thus be assigned to any desired voltage value V_detect.

Instead of the change in inductance, the change in the capacitance and/or the change in the resistance of suitable other components (combined with suitable adaptation of the electrical evaluating electronics) can be used in order to determine the absolute temperature. Generally speaking, the impedance can also be taken into account.

It should be mentioned that the ferroelectric temperature-recording material, with a suitable material composition, can likewise be used to detect the exceeding of a pre-determined maximum temperature, if, for example, a suitable material is first magnetized and the Curie temperature was adjusted by the material composition so that it is the same as the maximum or limit temperature.

It should furthermore be noted that in particular the above-described method can also be used as reversible method. In that case, "priming" (magnetization) of the ferroelectric material can be effected by an external magnetic field. If the material is demagnetized as a result of the maximum temperature being exceeded, the temperature-monitoring module can be re-activated again by re-applying a static magnetic field. Unlike the previously described temperature-recording material based on the piezoelectric effect, however, re-activation can be effected contactlessly.

Figure 5:
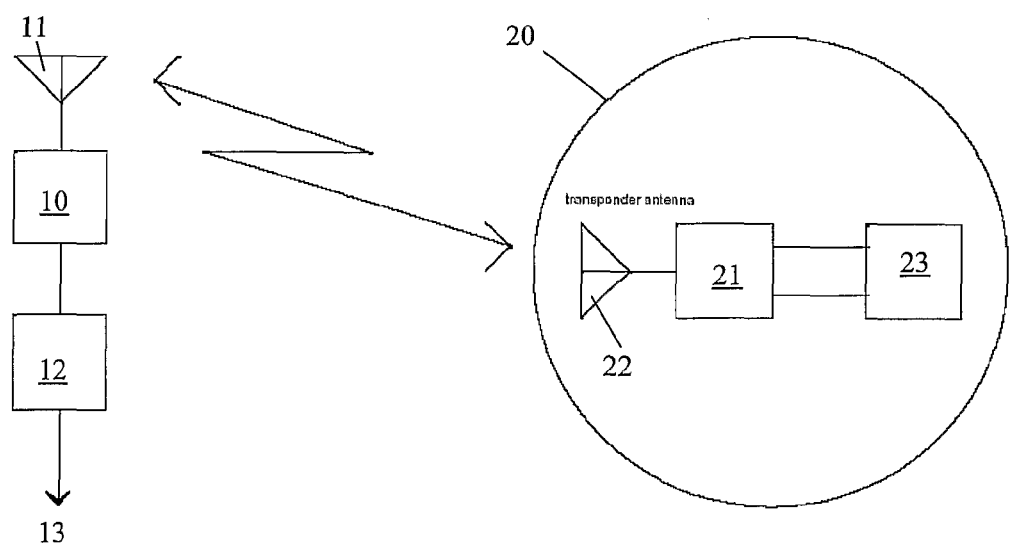
FIG. 5 shows schematically a block diagram of a data storage medium having a temperature-recording material as shown in FIG. 1.

FIG. 5 shows a complete system according to the invention, comprising at least one reader (scanner) 10 having at least one reader antenna 11 as well as at least one connected control unit 12 (e.g. a PC) and a data network connection 13 (e.g. intranet/internet) for data transfer to, for example, a sorting machine for rejecting defective products (e.g. spoilt foodstuffs).

Furthermore, FIG. 5 shows by way of example a transponder (data storage device) 20 according to the invention, comprising a semiconductor chip (IC) 21, an antenna connected thereto (for data communication with the reader) as well as a temperature-detection module 23 according to the invention. The temperature-detection module 23 comprises a temperature-recording material (a polarizable material, such as piezoelectric materials for example, or a magnetizable material, such as ferrites for example). It is a characteristic of the temperature-recording material 1 according to the invention that it is depolarizable or demagnetizable in dependence on the temperature when the ambient temperature rises above the Curie temperature.

The transponder system according to the invention can be part of an identification system, in which the data is transferred quickly and without inconvenient cable connections. Low-frequency systems below about 800 MHz are based on the inductive coupling of coils that are caused to resonate by means of capacitors and are therefore suitable only for slight distances in the range of a few centimeters. Because of physical constraints, in particular the higher frequency transponder systems from 800 MHz and upward are especially well suited for data exchange in the range of a few meters. In the case of these so-called RFID (Radio Frequency Identification) systems, a distinction is made between the active transponders or tags (having their own energy supply, e.g. a battery) and passive transponders or tags (with an energy supply provided by a HF field in combination with an electrical rectifier circuit). Since the latter transponders are activated only by a suitable HF alternating field (and are otherwise inactive), in the absence of a temperature-recording material 1 according to the invention there is no possibility for these types to monitor environmental changes, such as, for example, the temperature. However, the invention makes passive transponders useful for continuous temperature monitoring.

It has proved especially advantageous in this connection for the temperature-recording arrangement to be realized by the data storage medium 20, which comprises an integrated electrical circuit, that is, the semiconductor chip (IC) 21, and for the temperature-recording material to be an integral part of the integrated electrical circuit. The advantage in this collection is that connections that are relatively susceptible to interference between the integrated circuit and the temperature-recording material 1 can be omitted and the manufacture of the circuit for the data storage medium 20 or rather of the data storage medium 20 itself is substantially simplified, because additional production steps associated with the temperature-recording material 1 provided externally of the circuit need not be carried out. This provides the further advantage that the advantageous properties of the temperature-recording material are available directly in the circuit.

The invention claimed is:

1. A temperature-recording method for recording a temperature by means of an electrical circuit of a data storage medium, which electrical circuit is suppliable with energy by means of a signal feedable to the data storage medium, the method comprising:
    recording of a physical variable dependent on the temperature by means of the circuit supplied with energy, the physical variable being influenced by a temperature-recording material comprising a piezoelectric or ferroelectric material, co-operating with the circuit, which material comprises alignable electric or magnetic elementary dipoles and for which temperature-recording material a Curie temperature is known, wherein the alignment of the elementary dipoles gradually decreases over a limited temperature range which exceeds the Curie temperature.

2. A temperature-recording method as claimed in claim 1, wherein the recording of the physical variable dependent on the alignment of the elementary dipoles comprises:
    determining a reference value of the physical variable with the elementary dipoles of the temperature-recording material aligned; and
    comparing an instantaneous value of the physical variable with the reference value.

3. A temperature-recording method as claimed in claim 1, further comprising re-activating the temperature-recording material through re-alignment of the electric or magnetic dipoles, by applying an electrical or magnetic field.

4. A temperature-recording method as claimed in claim 1, wherein the recording of the physical variable dependent on the alignment of the electric or magnetic elementary dipoles comprises the recording of an electric voltage, or of a mechanical deformation or of a change in an electrical resistance and/or in an inductance and/or in an electrical capacitance.

5. A temperature-recording method as claimed in claim 4, wherein the recording of the physical variable dependent on the alignment of the elementary dipoles comprises the-opening or closing of electrical contacts by mechanical deformation of the temperature-recording material in dependence on the alignment of the elementary dipoles.

6. A temperature-recording arrangement for recording a temperature, comprising:
    a temperature-recording material comprising a piezoelectric or ferroelectric material with alignable electric or magnetic elementary dipoles, wherein the temperature-recording material has a Curie temperature which corresponds to a pre-determined limit temperature, wherein the alignment of the elementary dipoles gradually decreases in response to the temperature exceeding the Curie temperature; and
    means for recording a physical variable dependent on the alignment of the elementary dipoles in the temperature-recording material, comprising:
        a data storage medium; and
        an electrical circuit coupled to the temperature-recording material, wherein the electrical circuit is suppliable with energy by means of a signal feedable to the data storage medium, and the electrical circuit is configured to record the physical variable on the data storage medium.

7. A temperature-recording arrangement as claimed in claim 6, wherein the means for recording the physical variable dependent on the alignment of the electric or magnetic elementary dipoles are configured to determine a reference value of the physical variable with the elementary dipoles of the temperature-recording material aligned and to compare an instantaneous value of the physical variable with the reference value.

8. A temperature-recording arrangement as claimed in claim 6, wherein the temperature-recording material is re-activatable through re-alignment of the electric or magnetic dipoles, by applying an electric or magnetic field.

9. A temperature-recording arrangement as claimed in claim 6, further comprising a communications interface for contactlessly reading out the physical variable recorded by the temperature-recording arrangement in dependence on the alignment of the elementary dipoles of the temperature-recording material.

10. The temperature-recording arrangement of claim 6, wherein the electrical circuit comprises:
  an inductor comprising the ferroelectric material;
  a diode coupled to the inductor, the diode to rectify a partial voltage from the inductor;
  a capacitor coupled in series between an output of the diode and a ground reference, the capacitor in combination with the inductor to form an alternating voltage divider, wherein the capacitor is configured to smooth the partial voltage rectified by the diode;
  first and second resistors coupled in parallel with the capacitor, the first and second resistors to form a second voltage divider to output a drive voltage dependent on the temperature of the ferroelectric material; and
  a transistor coupled to the first and second resistors, the transistor to receive the drive voltage from the second voltage divider and to generate an output voltage dependent on the drive voltage, wherein a magnitude of the output voltage changes relative to a change in the temperature of the ferroelectric material.

11. A temperature-recording arrangement as claimed in claim 6, wherein the means for recording the physical variable dependent on the alignment of the electric or magnetic elementary dipoles are configured to record an electric voltage, or a mechanical deformation or a change in an electrical resistance and/or in an inductance and/or in an electrical capacitance.

12. A temperature-recording arrangement as claimed in claim 11, wherein the means for recording the physical variable dependent on the alignment of the electric or magnetic elementary dipoles are configured to determine an opening or a closing of electrical contacts by mechanical deformation of the temperature-recording material in dependence on the alignment of the elementary dipoles.

* * * * *